United States Patent [19]

Tanokura

[11] Patent Number: 5,624,768
[45] Date of Patent: Apr. 29, 1997

[54] GAS SHORTAGE PREVENTIVE CIRCUIT FOR A FUEL CELL POWER GENERATION SYSTEM

[75] Inventor: Kazuo Tanokura, Kawasaki, Japan

[73] Assignee: Fuji Electric Co., Ltd., Kanagawa, Japan

[21] Appl. No.: 338,745

[22] Filed: Nov. 9, 1994

[30] Foreign Application Priority Data

Nov. 12, 1993 [JP] Japan .................................. 5-282849

[51] Int. Cl.⁶ .................................................. H01M 8/04
[52] U.S. Cl. .................................. 429/23; 429/13; 429/25
[58] Field of Search ................................ 429/13, 23, 25

[56] References Cited

U.S. PATENT DOCUMENTS

| | | | |
|---|---|---|---|
| 4,677,037 | 6/1987 | Takabayashi | 429/9 |
| 4,706,178 | 11/1987 | Hayashi | 363/98 |
| 4,741,978 | 5/1988 | Takabayashi | 429/23 |
| 4,904,548 | 2/1990 | Tajima | 429/22 |
| 4,988,283 | 1/1991 | Nagasawa et al. | 429/17 |
| 5,009,967 | 4/1991 | Scheffler | 429/23 |
| 5,156,928 | 10/1992 | Takabayashi | 429/23 |
| 5,290,641 | 3/1994 | Harashima | 429/17 |

FOREIGN PATENT DOCUMENTS

| | | |
|---|---|---|
| 0039571 | 11/1981 | European Pat. Off. . |
| 0596367 | 5/1992 | European Pat. Off. . |
| 0528492 | 2/1993 | European Pat. Off. . |
| 570976 | 11/1993 | European Pat. Off. . |
| 2041800 | 3/1972 | Germany . |
| 4034183 | 5/1991 | Germany . |
| 9318556 | 9/1993 | WIPO . |

OTHER PUBLICATIONS

Graf "Safe and Simple Electrical Experiments", Dover Publications pp. 99–100 (no month).

*Primary Examiner*—Stephen Kalafut
*Assistant Examiner*—Carol Chaney
*Attorney, Agent, or Firm*—Spencer & Frank

[57] ABSTRACT

A gas shortage preventive circuit for use in a fuel cell power generation circuit that includes a fuel cell, an inverter, and a constant voltage controlling circuit. The gas shortage preventive unit cooperates with an overcurrent limiting unit. The gas shortage preventive unit has an allowable overcurrent value calculating portion which calculates an allowable overcurrent value based on a fuel utilization coefficient which is higher by a certain proportion higher than a standard value and the output current of the fuel cell. The gas shortage preventive unit also has a response speed controlling portion which eliminates transient variations from the allowable overcurrent value and outputs an overcurrent value signal. The overcurrent limiting unit outputs to the constant volume controlling circuit a signal for suppressing an overcurrent when the output current of the fuel cell exceeds the preset overcurrent value.

13 Claims, 7 Drawing Sheets

GAS SHORTAGE PREVENTIVE CIRCUIT FOR A FUEL CELL POWER GENERATION SYSTEM

BACKGROUND OF THE INVENTION

1. Field of the Invention

The present invention relates to a gas shortage preventive circuit for a fuel cell power generation system. More particularly, the invention relates to a gas shortage preventive circuit for a fuel cell power generation system that is controlled at a constant voltage level, which circuit prevents the occurrence of a shortage of fuel gas in a fuel cell caused by a delayed response of a fuel gas supply system upon an abrupt increase of the load to the system using an overcurrent protective circuit.

2. Description of Related Art

FIG. 1 is a schematic block diagram showing in a simplified manner a conventional fuel cell power generation system having an overcurrent protective circuit. In FIG. 1, a fuel cell stack 1 receives hydrogen-rich fuel gas from a reformer (not shown) and air as an oxidizer gas from an air feed (not shown) and converts chemical energy generated by the electrochemical reaction between hydrogen and oxygen into electrical energy, thus generating power. Output direct current, $I_{FC}$, of the fuel cell stack 1 flows to a power transformation circuit such as an inverter 2, which converts the direct current into alternating current. The alternating current is fed to a load 9. The inverter 2 is controlled by a constant voltage control circuit 3. The constant voltage control circuit 3 includes a voltage setting unit 3A which sets up a target voltage, a voltage detector 3B which detects the output voltage $V_o$ of the inverter 2, and a constant voltage controller 3C which performs a proportional and integral action. The constant voltage controller 3C issues a control signal 3S for decreasing any deviation of the detected voltage detected by the voltage detector 3B relative to the target voltage to control the output voltage $V_o$ of the inverter 2 at a constant level. An overcurrent protective circuit 4 includes an overcurrent setting unit 4A, a current detector 4B which detects the output current $I_{FC}$ of the fuel cell stack 1, a proportional and integral controller 5A, and a voltage blocking diode 5B connected between the constant voltage controller 3C and the proportional and integral controller 5A such that the direction of from the input side of the constant voltage controller 3C toward the output side of the proportional and integral controller 5A is taken as the forward direction. The proportional and integral controller 5A and the diode 5B together serve as an overcurrent controlling circuit 5.

FIG. 2 is a graph illustrating an overcurrent protective area PA for the conventional overcurrent protective circuit. The horizontal axis indicates the output current, $I_{FC}$, of the fuel cell stack 1 while the vertical axis indicates a set current value set for the overcurrent setting unit 4A. More particularly, in the conventional overcurrent protective circuit 4, a current value $I_{100}$ is set for the overcurrent setting unit 4A. This $I_{100}$ corresponds to 100% of the rated output current of the fuel cell stack 1. An area exceeding the value $I_{100}$, i.e., the hatched area in FIG. 2, is defined as the protective area PA. If the output current $I_{FC}$ from the fuel cell stack 1 exceeds the value $I_{100}$, the overcurrent protective circuit operates to decrease the overcurrent down to the rated current of the fuel cell stack 1.

Therefore, when the fuel cell power generation system is in a steady state of operation and a prescribed fuel consumption rate (usually 75%) and oxygen consumption rate (usually 75%) are maintained, the overcurrent protective circuit 4 operates as follows. The detected value of the output current $I_{FC}$ (detected by the current detector 4B) is below the set value $I_{100}$, which is set by the overcurrent setting unit 4A. The output from the proportional and integral controller 5A is saturated positively so that the flow of current through the voltage blocking diode 5B is blocked. The voltage setting unit 3A maintains the target voltage level. The inverter 2 is controlled to a constant voltage by the constant voltage controller 3C. On the other hand, when the fuel cell stack experiences an overcurrent reaching the protective area PA, due to a failure such as short circuit on the side of the load 9 connected to the output side of the inverter 2 or short circuit in the inverter 2, the current value detected by the current detector 4B exceeds the set value $I_{100}$ of the overcurrent setting unit 4A. When this occurs, the output from the proportional and integral controller 5A is reversed and saturated negatively. This makes the voltage blocking diode 5B become conductive and decreases the target voltage of the voltage controlling unit 3A. As a result, the constant voltage controller 3C issues the signal 3S for restricting the output current $I_{FC}$ from the inverter 2, thus performing a protective action for lowering the overcurrent of the fuel cell stack 1.

During steady state operation in which the fuel cell power generation system maintains a current value not higher than the rated current, if the load 9 requires a quick increase in power, the inverter 2 (which is controlled to a constant voltage) requires a quick increase in the output current $I_{FC}$ from the fuel cell stack 1 at a response speed of 2 milliseconds. On the contrary, the fuel cell stack 1 cannot follow such a sudden increase in the power output. It responds in a delayed manner since an increase in the power generated by the fuel cell stack 1 involves an increase in the supply of fuel gas, which is governed by the speed of response of the fuel gas supply system (not shown). The response of the fuel gas supply system is delayed to some extent, so that there occurs a temporary gas shortage in the fuel electrodes in the fuel cell stack 1. In addition, fuel cells have a so-called drooping characteristic, i.e., the output voltage of a fuel cell decreases as its output current increases. Hence, the inverter 2, which is controlled to be at a constant voltage, operates so as to further increase the output current $I_{FC}$ of the fuel cell stack 1, to maintain the output voltage $V_o$ of the inverter at a constant voltage. This causes the output voltage of the fuel cell to decrease further, thus forming a vicious cycle and finally the fuel cell has a gas shortage. The gas shortage influences to the fuel cell adversely, in that the constituent elements of the fuel cell deteriorate and this causes the power generation and service life of the fuel cell power generation system to decrease.

A fuel cell power generation system with the conventional overcurrent protective circuit 4, whose overcurrent protective area PA is an area above the rated current of the fuel cell, is intended primarily to protect the fuel cell against an excessive current which occurs in the fuel cell stack 1 due to a short circuit on the side of the load or a short circuit in the inverter. Its protective function does not cover protection against overcurrent which will occur due to a sudden increase in the load during steady state operation. Thus, a fuel gas shortage in the fuel cell stack caused by such an overcurrent, and damage to the fuel cell due to the overcurrent, cannot be avoided. In particular, in a light load area where the output current is low, the fuel gas is supplied in a small amount and differs to a great extent from the amount needed to reach the protective level. Hence, a sudden increase in the load in a light load area tends to cause a gas shortage and therefore unrecoverable damage to the fuel cell.

SUMMARY OF THE INVENTION

An object of the present invention is to provide a gas shortage preventive circuit for a fuel cell power generation system which can avoid overcurrent in a fuel cell and gas shortage due to the overcurrent, thereby preventing damage to the fuel cell.

Another object of the present invention is to provide a fuel cell power generation system having such a gas shortage preventive circuit.

Still another object of the present invention is to provide a method for preventing a gas shortage in a fuel cell power generation system.

According to the present invention, there is provided a gas shortage preventive circuit in a fuel cell power generation system comprising:

a fuel cell;

a power transformation circuit connected to an output side of the fuel cell;

a constant voltage controlling circuit having a constant voltage setting unit which presets a voltage, the constant voltage controlling circuit error-amplifying a deviation of an output voltage of the power transformer with respect to the preset voltage of the constant voltage setting unit; and a gas shortage preventive unit connected to the voltage setting unit and comprising:

an allowable overcurrent value calculating portion which calculates an allowable overcurrent value based on a fuel utilization coefficient which is higher by a fixed amount than a standard fuel utilization coefficient and an output current of the fuel cell and renews a previous value thereby; and a response speed controlling portion which eliminates a transient variation from the allowable overcurrent value calculated by the allowable overcurrent value calculating portion and outputs it as an overcurrent value to be preset; and an overcurrent limiting unit which outputs a signal for commanding a reduction of the preset voltage of the constant voltage setting unit toward the constant voltage controlling circuit when the output current of the fuel cell exceeds the preset overcurrent value.

Here, the overcurrent limiting unit may further comprise a proportional and integral controller which error amplifies any deviation between the output current of the fuel cell and the preset overcurrent value from the gas shortage preventive unit, and a voltage blocking diode arranged such that its forward direction is in the direction from the constant voltage controlling circuit to an output side of the proportional and integral controller.

The gas shortage preventive unit may comprise:

an allowable overcurrent value calculating portion which comprises a surplus setting unit and an adder connected to the surplus setting unit, the allowable overcurrent value calculating portion calculating an allowable overcurrent value which is the sum of a detected value of an output current from the fuel cell as a current value at a standard fuel utilization coefficient and a fixed current value corresponding to a surplus of a fuel utilization coefficient; and an upper limit controlling portion comprising an upper limit setting unit which presets an upper limit to the allowable overcurrent value and a blocking diode, the upper limit controlling portion suppressing the allowable overcurrent value to a level not exceeding a current that corresponds to a rated current value of the fuel cell.

The gas shortage preventive unit may comprise a lower limit controlling portion which presets a lower limit to the allowable overcurrent value, the lower limit controlling portion comprising:

a lower limit setting unit which presets a lower limit to the allowable overcurrent value corresponding to 50% of the rated current of the fuel cell; and a blocking diode connected to the lower limit setting unit and to the allowable overcurrent value calculating portion such that its forward direction is in the direction of from the lower limit setting unit toward an output side of the allowable overcurrent value calculating portion.

In the present invention, the gas shortage preventive unit is arranged to have an allowable overcurrent value calculating portion and a response speed controlling portion. In this arrangement, the allowable overcurrent value calculating portion calculates an allowable overcurrent value which corresponds to a higher fuel utilization coefficient (e.g., 85%). This higher fuel utilization coefficient is higher by a certain proportion than the output current from the fuel cell, which is operating at a standard fuel utilization coefficient (usually 75%). The allowable overcurrent value calculating portion outputs a signal corresponding to such a value and the response speed controlling portion, which comprises a filter having a response time constant similar to that of the fuel cell, eliminates any transient variations from the allowable overcurrent value calculated by the allowable overcurrent value calculating portion. The response speed controlling portion outputs a signal indicating such a value toward the downstream overcurrent limiting unit. As a result, the overcurrent value obtained by the gas shortage preventive unit indicates an allowable value (surplus) of the overcurrent in a certain proportion thereof and an allowable value (surplus) of the overcurrent fuel utilization coefficient in a certain proportion thereof within the range of 0 to 100% of the rated current of the fuel cell. Hence, the overcurrent limiting unit, which uses the gas shortage preventive unit as a device for setting an overcurrent value, issues a signal for reducing the preset voltage that is regulated by the constant voltage controlling circuit when the output current of the fuel cell exceeds the overcurrent value. The constant voltage controlling circuit, upon receipt of a signal from the overcurrent limiting unit, controls the inverter to reduce the output current of fuel cell. As a result of a series of these actions, the fuel cell is protected from an overcurrent and a gas shortage simultaneously. This makes it possible for the fuel cell to follow a sudden increase in the load while maintaining the fuel utilization coefficient at 85%, for example. Therefore, the problem of gas shortages which tend to occur upon a sudden increase in the load can be solved. Also, the deterioration of the materials constituting the fuel cell which would occur concomitantly with the gas shortage can be avoided, as can the reduction in the power generation performance and service life of the fuel cell due to such deterioration.

Furthermore, the overcurrent limiting unit may comprise a proportional and integral controller which error amplifies any deviation of the output current of the fuel cell with respect to the allowable overcurrent value, and a voltage blocking diode connected such that its forward direction is in the direction from the constant voltage controlling circuit toward the output side of the proportional and integral controller. The gas shortage preventive unit serves as an overcurrent setting unit for the overcurrent limiting unit, so that the function of an overcurrent controlling unit having the same arrangement as the conventional overcurrent controlling unit 5 (FIG. 1) can be extended to cover a protective function against an overcurrent and a gas shortage preventive function in response to an increase in the load.

Moreover, in an arrangement where the allowable overcurrent value calculating portion comprises a surplus setting unit and an adder, a current value corresponding to a fuel utilization coefficient which is higher by a certain proportion than a standard fuel utilization coefficient can be set in the surplus setting unit as a surplus or allowance. The adder adds the surplus to the detected value of the output current from the fuel cell to give the allowable overcurrent value. Thus, the allowable overcurrent value can be obtained without difficulty by the allowable overcurrent value calculating portion, which has a simplified arrangement. Further an upper limit controlling portion which comprises an upper limit setting unit and a blocking diode can be used to set an upper limit to the allowable overcurrent value. In this arrangement, the allowable overcurrent value becomes a value equivalent to the rated current when it reaches an output current which is the same as the difference between the rated current value of the fuel cell and the surplus. In an area where the output current from the fuel cell is large enough to exceed the difference between the rated current and the surplus, protection against a short circuit current or the like is obtained in the area exceeding the rated current.

Still further, the gas preventive unit may be provided with a lower limit controlling portion which comprises a lower limit setting unit which sets an allowable current value corresponding to 50% of the rated current of the fuel cell, and a blocking diode connected such that its forward direction is in the direction from the lower limit setting unit toward the output side of the allowable overcurrent value calculating portion. With such a lower limit controlling portion, the surplus of the allowable overcurrent value can be increased so as to offset the decrease in the output current of the fuel cell in a light load area corresponding to a current not exceeding 50% of the rated current. In this area, the amount of fuel gas that is supplied is maintained at a level corresponding to 50% of the rated current and this secures a surplus. Gas shortages which tend to occur upon a sudden increase in the load in a low load area can be prevented and the ability of the fuel cell to follow an increase in the load can be improved. Also, for a large overcurrent which exceeds the allowable overcurrent, the output current of the fuel cell is reduced by the protective action against overcurrents and thus a gas shortage is prevented.

The above and other objects, effects, features and advantages of the present invention will become more apparent from the following description of the embodiments thereof taken in conjunction with the accompanying drawings.

DESCRIPTION OF PREFERRED EMBODIMENTS

Hereinafter, the embodiments of the present invention will be described in greater detail with reference to the attached drawings. However, the present invention should not be construed as being limited thereto.

Embodiment 1

Figure 1:
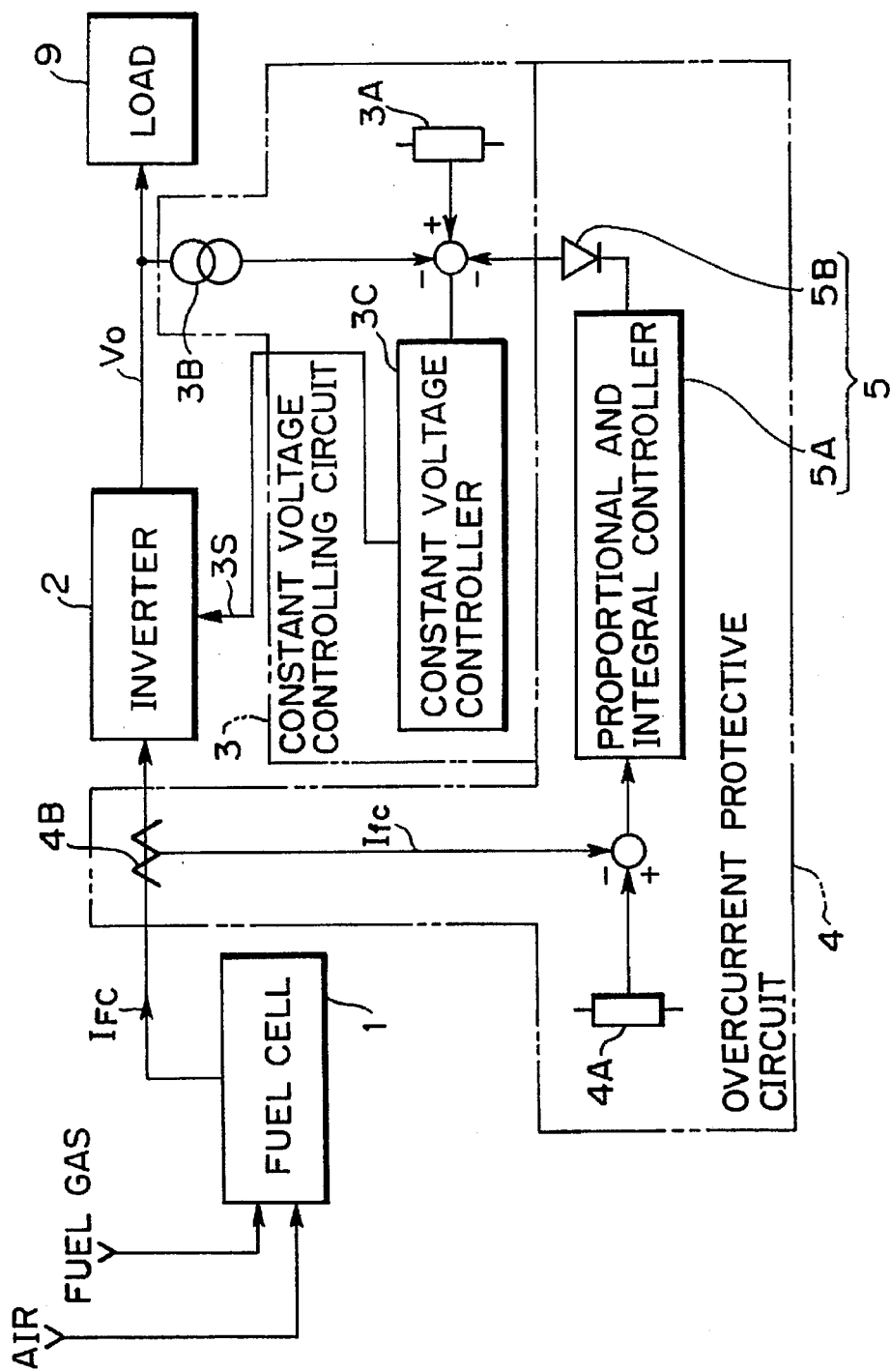
FIG. 1 is a block diagram showing in a simplified manner a conventional fuel cell power generation system having an overcurrent protective circuit.
Figure 2:
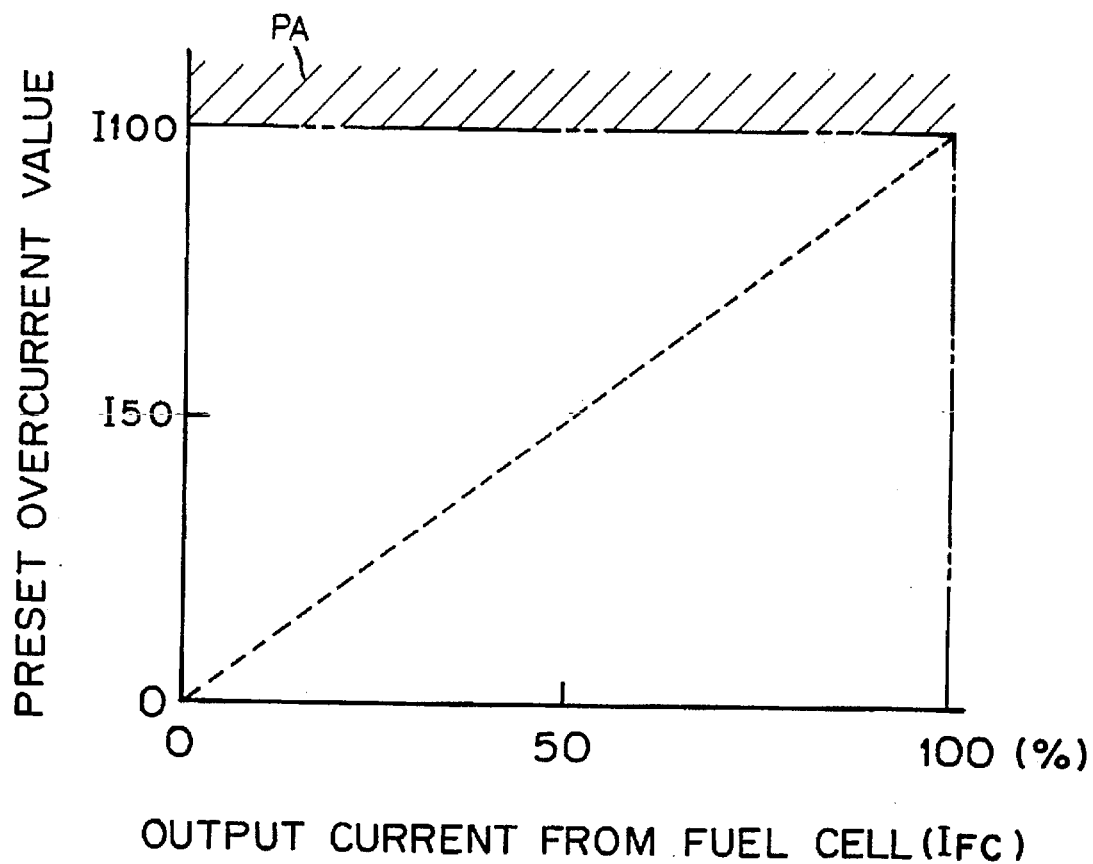
FIG. 2 is a graph illustrating an overcurrent protective area for the conventional overcurrent protective circuit.
Figure 3:
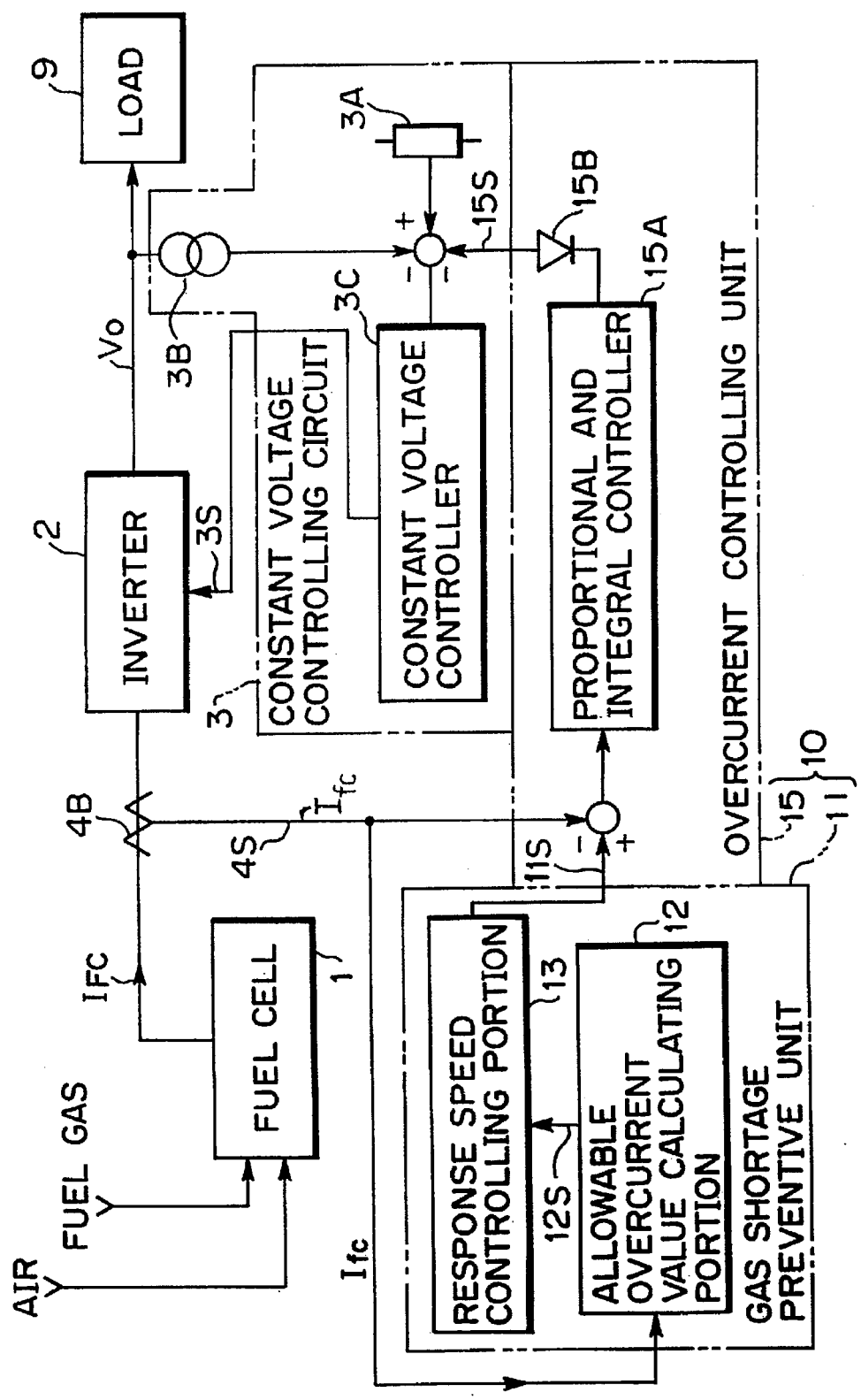
FIG. 3 is a schematic block diagram showing in a simplified manner a fuel cell power generation system having a gas shortage preventive circuit according to an embodiment of the present invention.

FIG. 3 is a schematic block diagram showing in a simplified manner a fuel cell power generation system having a gas shortage preventive circuit according to a first embodiment of the present invention. In FIG. 3, like reference numerals designate like elements or parts in FIG. 1. In FIG. 3, a fuel cell stack 1 receives hydrogen-rich fuel gas from a reformer (not shown) and air as an oxidizer gas from an air feed (not shown). The fuel cell stack 1 converts chemical energy generated by the electrochemical reaction between hydrogen and oxygen into electrical energy, thus generating power. Output direct current, $I_{FC}$, of the fuel cell stack 1 flows to a power transformation circuit such as an inverter 2, which converts the direct current into alternating current. The alternating current is fed to a load 9. The transformer 2 is controlled by a constant voltage control circuit 3. The constant voltage control circuit 3 includes a voltage setting unit 3A in the form of a variable resistor which sets up a target or reference voltage. The circuit 3 also includes a voltage detector 3B in the form of a potential transformer (PT) which detects an output voltage $V_o$ of the inverter 2, and a constant voltage controller 3C. The constant voltage controller 3C issues a control signal 3S for decreasing any deviation of the detected voltage detected by the voltage detector 3B with respect to the target voltage to control the output voltage $V_o$ of the inverter 2 at a constant level.

In FIG. 3, a gas shortage preventive circuit 10 includes a gas shortage preventive unit 11 and an overcurrent controlling or limiting unit 15. The gas shortage preventive circuit 10 receives a signal 4S corresponding to a detected output current value, $I_{FC}$, from a detector 4B in the form of, e.g., a current transformer. The gas shortage preventive unit 11 outputs a signal 11S corresponding to an allowable standard overcurrent value. The overcurrent limiting unit 15 receives the overcurrent setting value 11S and the detected output current value $I_{FC}$ and outputs a blocking signal 15S to the voltage setting unit 3A of the constant voltage controlling circuit 3.

The gas shortage preventive unit 11 has an allowable overcurrent value calculating portion 12 and a response speed controlling portion 13. The allowable overcurrent calculating portion 12 receives from the current detector 4B the detected current value $I_{FC}$ of the output current $I_{FC}$ of the fuel cell stack 1, which is operated while keeping a standard fuel utilization factor or coefficient of, e.g., 75% of the rated fuel utilization value for the current $I_{FC}$. The allowable overcurrent value calculating portion 12 calculates an allowable overcurrent value corresponding to a fuel utilization coefficient of 85%, which is higher by a fixed proportion, e.g., 10%, than the standard fuel utilization coefficient, and outputs a signal 12S corresponding to the calculated higher fuel utilization coefficient, (85%) to the response speed controlling portion 13. The response speed controlling portion 13 has a filter having a time constant similar to that of the fuel cell stack 1, and creates the signal 11S indicating an allowable overcurrent target value. The allowable overcurrent target value corresponds to the difference between the allowable overcurrent value 12S and a transient variation which could occur in the allowable overcurrent value due to a variation of the output current $I_{FC}$. The signal 11S is received by the overcurrent limiting unit 15. The overcurrent limiting unit 15 includes a proportional and integral controller 15A and a voltage blocking diode 15B. The proportional and integral controller 15A receives the detected current value $I_{FC}$ and the allowable overcurrent target value 11S and error-amplifies any deviation therebetween. The voltage blocking diode 15B is connected between the input side of the constant voltage controller 3C and the output side of the proportional and integral controller 15A such that its forward direction is from the input side of the constant voltage controller 3C toward the output side of the proportional and integral controller 15A. As a result, when the detected current value 4S exceeds the allowable overcurrent target value 11S, the output of the proportional and integral controller 15A is reversed and saturates negatively so that the voltage blocking diode 15B becomes conductive to lower the target voltage of the constant voltage setting unit 3A. This causes the constant voltage controller 3C to issue a control signal 3S which restricts the output of the inverter 2. In this manner, an overcurrent in the fuel cell stack 1 is suppressed.

In a fuel cell power generation system having the above-described gas shortage preventive circuit 10, an excess amount of fuel can be consumed with a fuel utilization coefficient of 85%, which is higher by 10% than the standard fuel utilization coefficient (e.g., 75%) during steady state operation, for an increase in the load within the range below the preset value of the overcurrent. For an increase in the load above the preset overcurrent value, an overcurrent protective control action starts which suppresses the overcurrent below the fuel utilization coefficient of 85% and enables a control that follows the increase in the load. This eliminates overcurrent and gas shortage and prevents the characteristics of the fuel cell from deteriorating. Although the allowable fuel utilization coefficient is set to 85%, the present invention is not limited thereto and any fuel utilization coefficient value can be selected so far as it does not lead to an adverse influence on the characteristics of the fuel cell.

Embodiment 2

Figure 4:
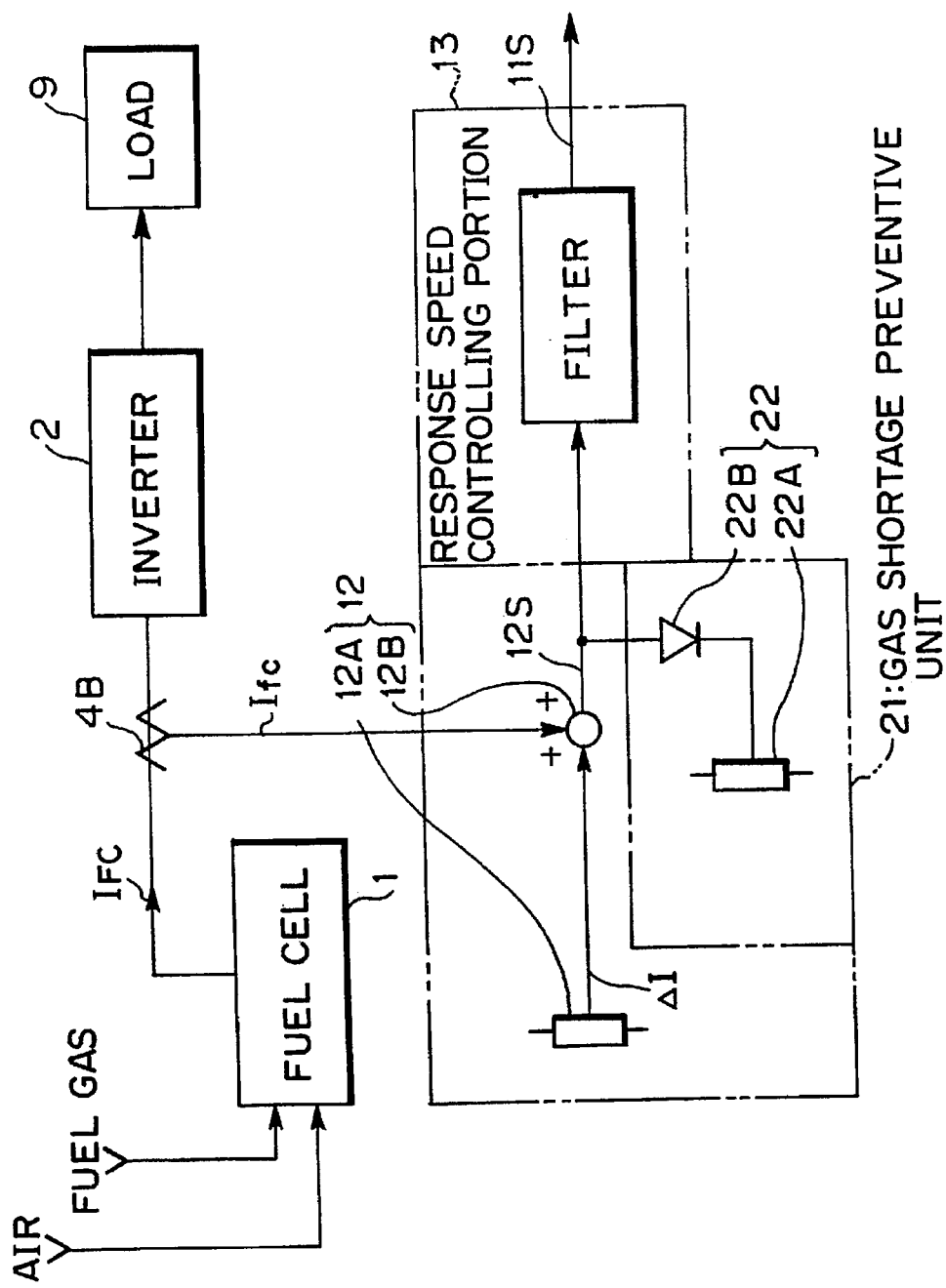
FIG. 4 is a schematic block diagram showing in a simplified manner a gas shortage preventive circuit according to another embodiment of the present invention.

FIG. 4 is a schematic block diagram showing in a simplified manner a gas shortage preventive circuit according to a second embodiment of the present invention. As shown FIG. 4, a gas shortage preventive unit 21 includes an upper limit setting portion 22 as well as an allowable overcurrent value calculating portion 12. The present embodiment differs from Embodiment 1 in that the upper limit setting portion 22 is present and the following explanation will be focused on the difference. Other arrangements are the same as in Embodiment 1. The allowable overcurrent value calculating portion 12 has a surplus setting unit 12A and an adder 12B. A current value of $\Delta I_{fc}$ which corresponds to a surplus of, e.g., 10% for a standard fuel utilization coefficient, e.g., 75%, is set up in the surplus setting unit 12A, which sends this data to the adder 12B. The adder 12B adds the current value $\Delta I_{fc}$ to the detected current value $I_{fc}$ of the output current $I_{FC}$ and issues a signal 12S corresponding to an allowable overcurrent of $I_{fc}+\Delta I_{FC}$ that corresponds to a fuel utilization coefficient of 85%. A response speed controlling portion 13 includes a filter having a response time constant similar to that of the fuel cell stack 1 and eliminates variations in the allowable overcurrent 12S due to variations of the output current, $I_{fc}$. The response speed controlling portion 13 issues a signal 11S indicating an overcurrent set value to the overcurrent limiting unit 15 (not shown in FIG. 4). The upper limit controlling portion 22 includes an upper limit setting unit 22A in the form of a variable resistor and a voltage blocking diode 22B. The upper limit setting unit 22A is preset to a current value of $I_{100}$, which corresponds to the rated current of the fuel cell stack 1, as the upper limit value for the allowable overcurrent value 12S. When an overcurrent which exceeds the rated output current occurs in the fuel cell stack 1, the voltage blocking diode 22B becomes conductive and suppresses the allowable overcurrent value 12S to the preset upper limit value so that the allowable overcurrent value 12S does not increase any more. This provides a protective action for causing an overcurrent, such as a short circuit current falling in the protective area which is above the rated current, to be suppressed.

Figure 5:
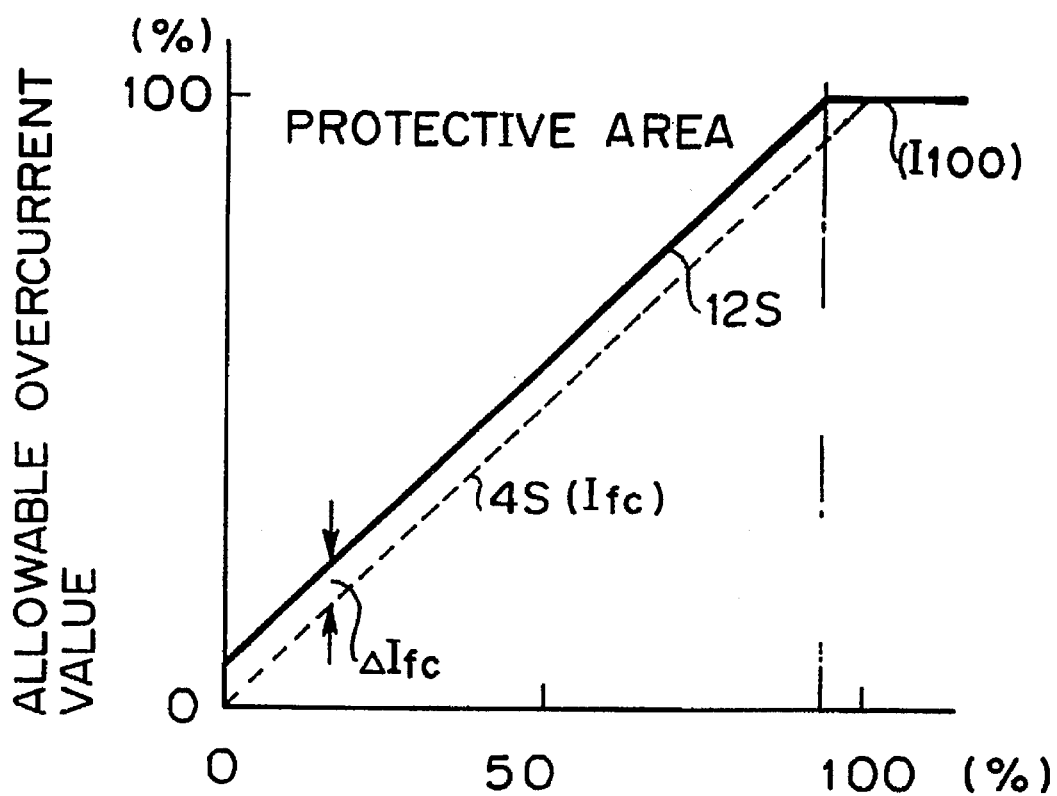
FIG. 5 is a graph illustrating allowable overcurrent characteristics of the gas shortage preventive circuit shown in FIG. 4.

FIG. 5 is a graph illustrating allowable overcurrent characteristics of the gas shortage preventive circuit according to the second embodiment shown in FIG. 4. The dotted line corresponds to a fuel utilization coefficient of 75%. The allowable overcurrent value 12S (corresponding to a fuel utilization coefficient of 85%) is a value which is higher than the detected current value 4S ($I_{fc}$) by the surplus ($\Delta I_{fc}$), i.e., $I_{fc}+\Delta I_{fc}$, for a current range of 0 to 90% of the rated current of the fuel cell stack 1. On the other hand, for the current range above 90% of the rated current, the upper limit setting portion 22 operates to suppress the allowable overcurrent value 12S to the value $I_{100}$ and, hence, the surplus $\Delta I_{fc}$ becomes substantially null (0) when the rated current flows in the fuel cell stack 1. As a result, the overcurrent protective area covered by the gas shortage preventive circuit according to the instant embodiment extends to an area above the allowable overcurrent value 12S indicated by a solid line in FIG. 5. In this case, the protective action against overcurrent and gas shortage is performed with the surplus $\Delta I_{fc}$ being maintained over substantially all the area of the output current $I_{FC}$ of the fuel cell stack 1. Thus, for a variation in the output current $I_{FC}$ within the range of the surplus $\Delta I_{fc}$, an increase in the load is coped with or absorbed by a temporary increase in fuel consumption coefficient within the range of up to 85%. On the other hand, for an increase in the load above the surplus $\Delta I_{fc}$, the overcurrent protective circuit issues the control signal 3S, via the overcurrent limiting unit 15 and the constant voltage controlling unit 3, to the inverter 2 (see FIG. 3). This reduces the output current $I_{FC}$ to a certain extent to suppress the fuel utilization coefficient to 85%. Thus, the occurrence of a gas shortage is prevented effectively.

Embodiment 3

Figure 6:
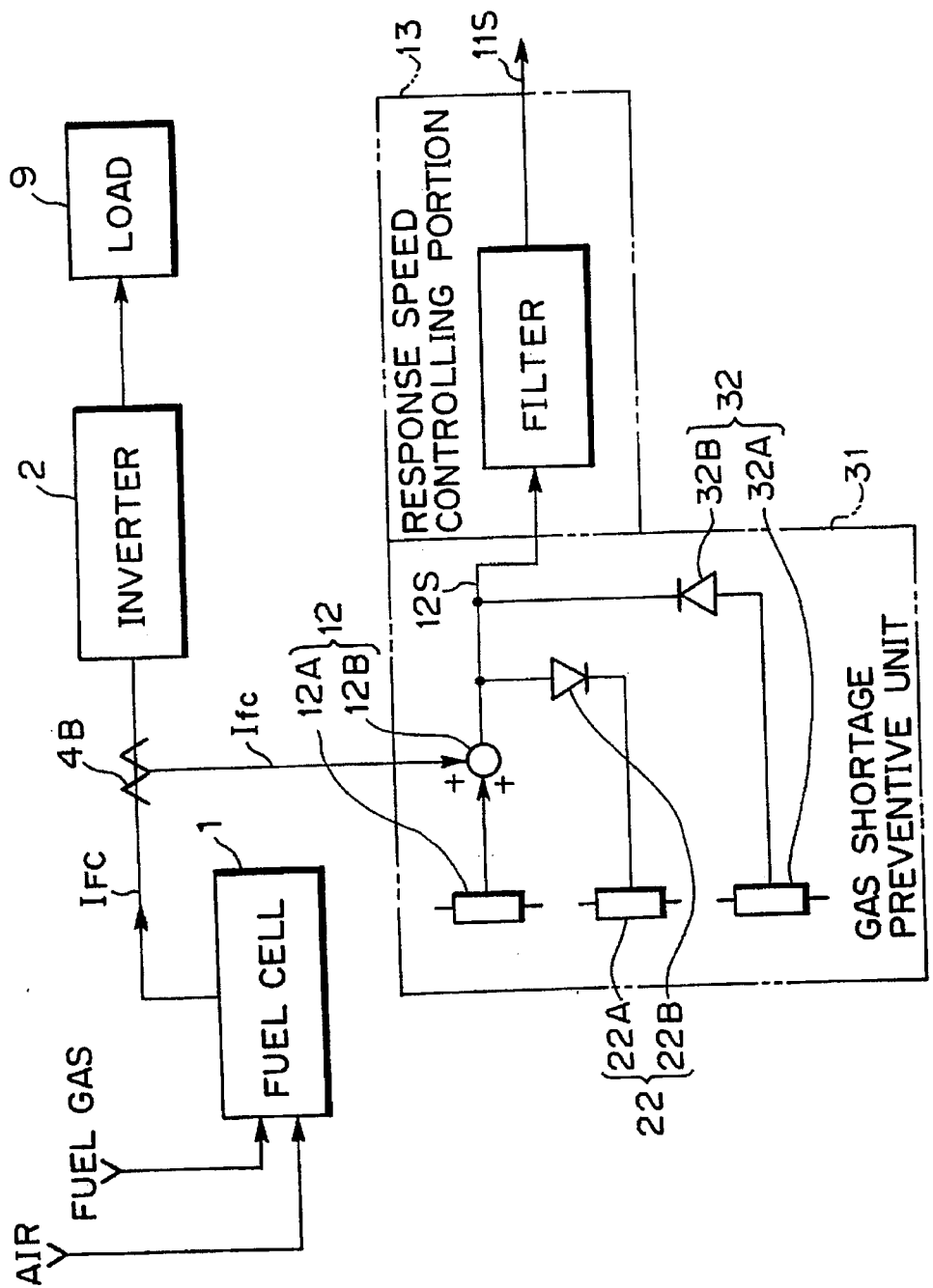
FIG. 6 is a schematic block diagram showing in a simplified manner a gas shortage preventive circuit according to still another embodiment of the present invention.

FIG. 6 is a schematic block diagram showing in a simplified manner a gas shortage preventive circuit according to a third embodiment of the present invention. The instant embodiment differs from Embodiment 2 in the arrangement of the gas shortage preventive unit and the following explanation will be focused on the difference. Other arrangements are the same as in Embodiments 1 and 2. In FIG. 6, a gas shortage preventive unit 31 includes a lower limit controlling or setting portion 32 as well as an allowable overcurrent value calculating portion 12 and an upper limit controlling or setting portion 22. The lower limit setting portion 32 includes a lower limit setting unit 32A in the form of a variable resistor and a voltage blocking diode 32B. The lower limit setting unit 32A is preset to an allowable overcurrent value $I_{50}$ which corresponds to 50% of the rated current value of the fuel cell stack 1. The voltage blocking diode 32B is connected to the lower limit setting unit 32A and to the allowable overcurrent value calculating portion 12 such that its forward direction is the direction from the lower limit setting unit 32A toward the output side of the allowable overcurrent value calculating portion 12. In this arrangement, when the allowable overcurrent value 12S decreases below the preset value, $I_{50}$, of the lower limit setting unit 32A, the voltage blocking diode 32B becomes conductive so that the allowable overcurrent value 12S is increased up to a level above the current value $I_{50}$.

Figure 7:
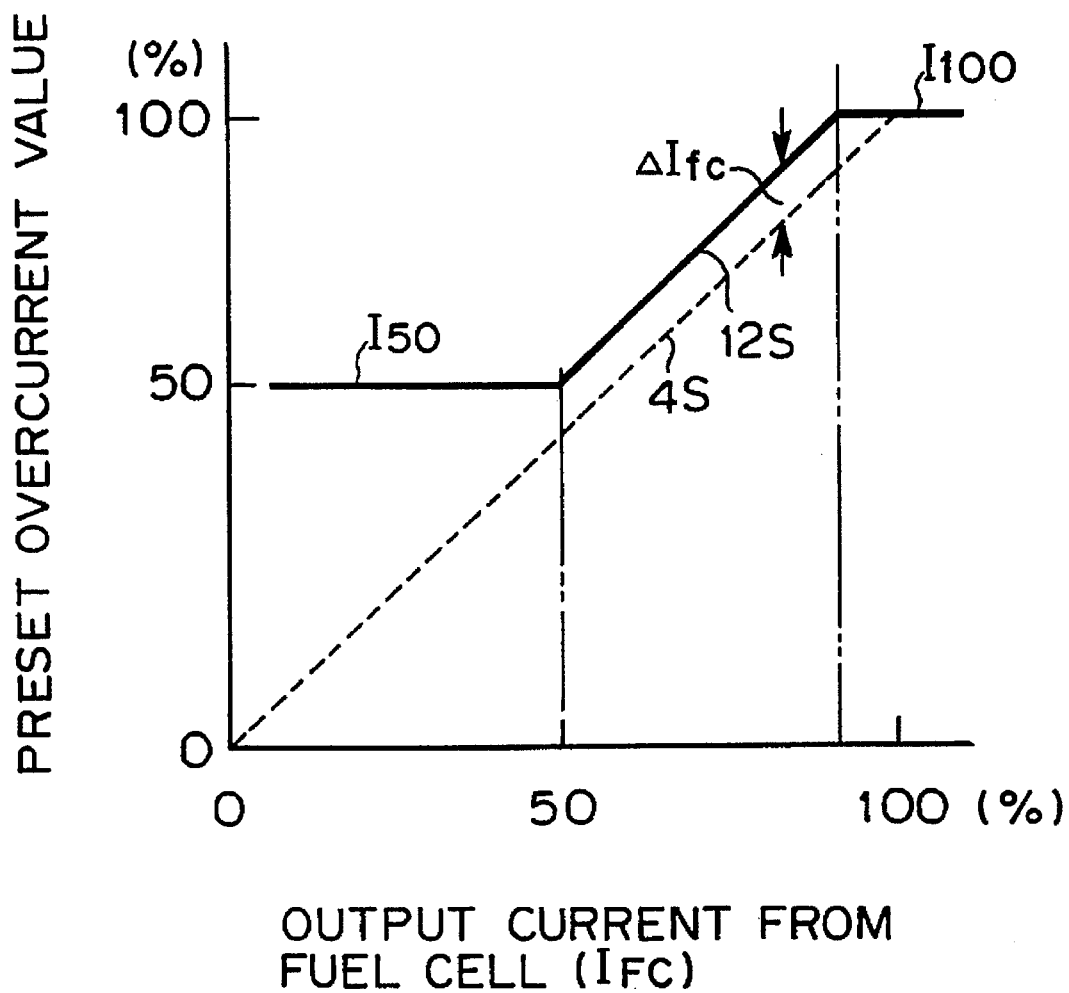
FIG. 7 is a graph illustrating allowable overcurrent characteristics of the gas shortage preventive circuit shown in FIG. 6.

FIG. 7 is a graph illustrating the allowable overcurrent characteristics of the gas shortage preventive circuit according to the third embodiment shown in FIG. 6. In a light load area where the output current, $I_{FC}$, of the fuel cell stack 1 has decreased to a level below 50% of the rated current, the allowable overcurrent value 12S is maintained at a constant level $I_{50}$ by the action of the lower limit setting portion 32. In the light load area, the surplus $\Delta I_{fc}$ of the allowable overcurrent value is increased so as to offset the decrease in the output current $I_{FC}$ of the fuel cell stack 1. Controlling the fuel gas supply system so that it can supply fuel gas in an amount corresponding to a constant level of 50% of the load, in the light load area where the load does not exceed 50% of the rated current, causes the fuel cell power generation system to be operated in a steady state having an allowance or surplus in the fuel gas supply that corresponds to the surplus, $\Delta I_{fc}$, of the allowable overcurrent value. For example, the fuel gas supply system can be controlled by adjusting the flow of raw fuel gas, i.e., by opening or closing of a raw fuel control valve (not shown) inserted between a raw fuel source (not shown) and a reformer (not shown) connected to the fuel cell in accordance with a signal commanding an actuator to actuate the raw fuel control valve from a controller in the form of, e.g., a computer. During operation in this state, if the inverter requires a sudden increase in the output current from the fuel cell stack 1, the fuel cell stack 1 can respond to such a requirement without delay and without causing a gas shortage. This prevents gas shortages and decreases in the performance of the fuel cell which would tend to occur in a fuel cell power generation system having the conventional gas shortage preventive circuit arrangement in the case where a sudden increase in the output current is required during operation in a light load condition. In addition, for an overcurrent exceeding the allowable overcurrent value $I_{50}$, the gas shortage preventive circuit of the present invention performs a protective action against the overcurrent by reducing the output current of the fuel cell to prevent the occurrence of a gas shortage in the fuel cell stack.

As described above, in accordance with the present invention, a gas shortage preventive circuit in a fuel cell power generation system whose output is controlled to a constant voltage using a constant voltage controlling circuit includes a gas shortage controlling unit. An output overcurrent value is set and an overcurrent controlling or limiting unit operates upon receipt of a signal which is a fraction of the preset overcurrent value. As a result, it is possible to perform a protective action against an overcurrent based on the output current of the fuel cell and the preset overcurrent value issued by the gas shortage preventive circuit, with the fuel utilization coefficient being higher by a certain fixed amount than a standard value. As a result, an overcurrent which occurs due to a sudden increase in load during steady state operation can be reduced to a value below the preset overcurrent value and at the same time the fuel utilization coefficient can be suppressed to a level not higher than a value that is higher by a certain fixed amount than a standard value corresponding to the preset overcurrent value. Therefore, the gas shortage preventive circuit of the present invention can prevent not only a gas shortage and deterioration of the performance of the fuel cell due to the gas shortage, which would have been encountered in the conventional arrangement, but it can also contribute to an increase in the service life of the fuel cell.

Moreover, an upper limit setting portion can be provided for setting an upper limit for the preset overcurrent value to the gas shortage preventive device, thereby enabling protection against an overcurrent such as short circuit current in a heavy load area. A lower limit setting unit for setting a lower limit for the preset overcurrent value eliminates the danger of a gas shortage which tends to occur at a sudden increase in the load in a light load area, and improves the followability of the fuel cell toward a sudden increase in the load.

The present invention has been described in detail with respect to several embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A fuel cell power generation system for use with a load, comprising:

a fuel cell having an output side;

an inverting system connected to said output side of said fuel cell, said inverting system generating an inverting system output voltage which is supplied to the load;

a constant voltage controlling circuit which generates a control signal that is supplied to said inverting system for controlling said inverting system output voltage, said constant voltage controlling circuit having a constant voltage setting unit which sets a target voltage, said constant voltage controlling circuit error-amplifying any deviation between said inverting system output voltage and said target voltage;

a gas shortage preventive unit which includes
      an allowable overcurrent value calculating portion which calculates an allowable overcurrent value, said allowable overcurrent value being a function of a fuel utilization coefficient that is higher than a standard fuel utilization coefficient and an output current of said fuel cell, and
      a response speed controlling portion which eliminates any transient variation from the allowable overcurrent value and outputs it as an allowable overcurrent target value; and an overcurrent limiting unit which outputs a signal for reducing said target voltage of said constant voltage setting unit when the output current of said fuel cell exceeds the allowable overcurrent target value.

2. The fuel cell power generation system as claimed in claim 1, wherein said overcurrent limiting unit comprises means for error amplifying any deviation of the output current of said fuel cell from the allowable overcurrent target value from said gas shortage preventive unit, and a voltage blocking diode which is connected to said constant voltage controlling circuit.

3. The fuel cell power generation system as claimed in claim 1, wherein said allowable overcurrent value calculating portion comprises:

a surplus setting unit for setting a value corresponding to an increase in the fuel utilization coefficient above the standard value, and an adder connected to said surplus setting unit, said adder calculating said allowable overcurrent value by adding a detected value of said output current from said fuel cell and said value corresponding to an increase in the fuel utilization coefficient above the standard value.

4. The fuel cell power generation system as claimed in claim 3, wherein said gas shortage prevention unit further comprises an upper limit controlling portion which includes an upper limit setting unit that sets an upper limit to the allowable overcurrent value, and a blocking diode which is connected to said adder, said upper limit controlling portion suppressing said allowable overcurrent value to a level not exceeding a current that corresponds to a rated current value of said fuel cell.

5. The fuel cell power generation system as claimed in claim 4, wherein said gas shortage preventive unit further comprises a lower limit controlling portion which presets a lower limit to the allowable overcurrent value, said lower limit controlling portion comprising:

a lower limit setting unit which sets a lower limit to the allowable overcurrent value corresponding to a percentage of the rated current of said fuel cell; and a blocking diode connected to said lower limit setting unit and to said adder such that its forward direction is in the direction of from said lower limit setting unit toward said adder.

6. The fuel cell power generation system as claimed in claim 5, wherein said percentage is about 50%.

7. A fuel cell power generation system for use with a load, comprising:

fuel cell means for receiving a fuel gas and generating a fuel cell output current;

an inverting system which receives the fuel cell output current and generates an inverting system output voltage that is supplied to the load;

a constant voltage controlling circuit connected to the inverting system, the constant voltage controlling circuit including feedback means for bringing the inverting system output voltage to a target voltage;

a detector which senses the fuel cell output current and generates a detected current signal;

gas shortage preventive unit means for generating an allowable overcurrent target value from the detected current signal; and overcurrent limiting unit means, connected to the detector, the gas shortage preventive unit means, and the constant voltage controlling circuit, for influencing the feedback means to reduce the inverting system output voltage if the fuel cell output current exceeds the allowable overcurrent target value.

8. The system of claim 7, wherein the gas shortage preventive unit means comprises means for generating a signal that is greater than the detected current signal.

9. The system of claim 8, wherein the means for generating a signal that is greater than the detected current signal comprises means for adding a value to the detected current signal.

10. The system of claim 9, wherein the gas shortage preventive unit means further comprises a filter connected to the means for adding.

11. The system of claim 9, wherein the gas shortage preventive unit means further comprises means for setting a first limit voltage, and a first diode connecting the means for setting a first limit voltage to the means for adding.

12. The system of claim 11, wherein the gas shortage preventive unit means further comprises means for setting a second limit voltage, and a second diode connecting the means for setting a second limit voltage to the means for adding.

13. The system of claim 12, wherein the first diode has a forward direction toward the means for adding and the second diode has a forward direction away from the means for adding.

* * * * *